April 8, 1930.  N. MEROUSSIS  1,753,614
FLASH LIGHT ATTACHMENT
Filed Dec. 28, 1928
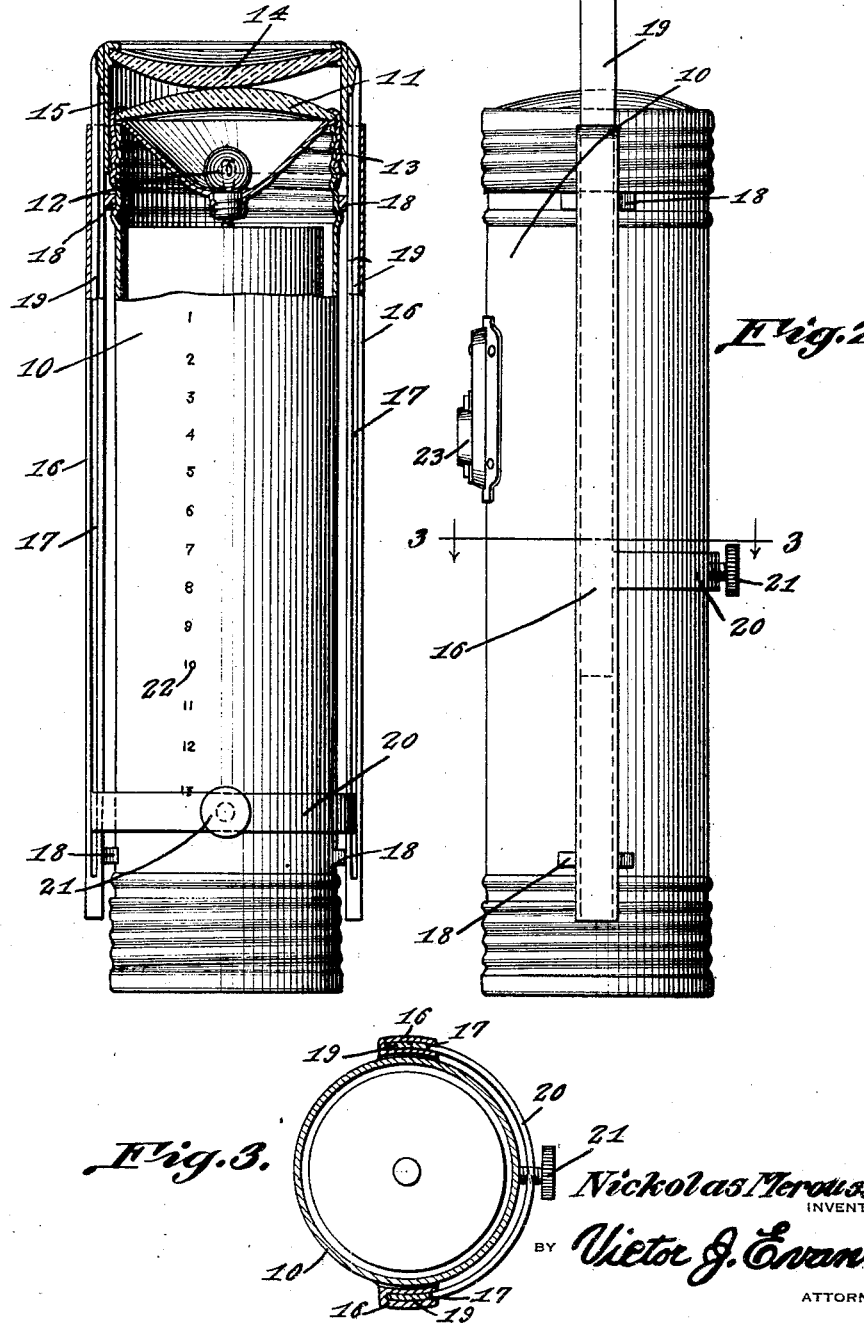

Patented Apr. 8, 1930

1,753,614

UNITED STATES PATENT OFFICE

NICKOLAS MEROUSSIS, OF NEW YORK, N. Y.

FLASH LIGHT ATTACHMENT

Application filed December 28, 1928. Serial No. 329,050.

This invention relates to flashlights and has for an object the provision of means for increasing the power of the light without increasing the current consumption or the voltage of the batteries.

Another object of the invention is the provision of combined means for adjusting the focus of the light and increasing its power, which means is of such character and so constructed that it may be applied to an ordinary flashlight.

With the above and other objects in view, the invention further includes the following novel features and details of construction, to be hereinafter more fully described, illustrated in the accompanying drawing and pointed out in the appended claims.

In the drawing:—

Figure 1 is an elevation partly in section illustrating the invention.

Figure 2 is an elevation at rightangles to Figure 1 showing the adjustable lens partly extended.

Figure 3 is a section on the line 3—3 of Figure 2.

Referring to the drawing in detail wherein like characters of reference denote corresponding parts, the reference character 10 indicates the shell or casing of the flashlight which is of tubular construction and which has mounted at one end a lens 11, which may be concavo convex, plano convex, or double convex, a source of light 12 and a reflector 13. All of the foregoing may be of the usual or any preferred construction.

The present invention employs a second concavo convex lens 14 which is arranged reversely with respect to the lens 11 and is mounted within a collar 15 which telescopes over the end of the casing.

Secured to diametrically opposite sides of the casing and extending longitudinally thereof are guide sleeves 16. These sleeves may be of suitable cross sectional shape such as round or flat, the latter being shown, while slots 17 extend longitudinally of the sleeves. The sleeves may be attached to the flashlight casing 10 in any suitable manner such as attaching bands extending around the casing, or they may be attached through the medium of lugs 18 which are soldered or otherwise suitably secured to the casing. They are spaced sufficiently from the casing to permit the collar 15 to telescope over the end of the casing as shown in Figure 1.

Attached to diametrically opposite sides of the collar 15 are arms 19 which extend into and are slidable within the sleeves and connecting these arms is a bar 20 which is curved and extends transversely of the casing through the slots 17 with its opposite ends connected to the arms 19. The bar 20 carries a set screw 21 which is adjustable therein and which engages the casing. By loosening the set screw, the arms may be moved longitudinally to adjust the lens 14 with respect to the lens 11 and when the desired adjustment is obtained, the lens 14 may be held in adjusted position through the medium of the set screw 21.

By means of the lens 14, the rays of light passing through the lens 11 will be magnified and their power increased, the proper focus being obtained by adjusting the position of the lens 14. For the purpose of aiding in making the desired adjustment, the casing 10 is calibrated as shown at 22 and the bar 20 may be positioned with respect to these calibrations.

While two lenses are shown and described, it is to be understood that a single lens may be employed which will serve as a projector in the same manner as a plurality of lenses.

The invention is susceptible of various changes in its form, proportions and minor details of construction and the right is herein reserved to make such changes as properly fall within the scope of the appended claims.

Having described the invention what is claimed is:

1. In combination with a flashlight having a tubular casing, a concavo convex lens at one end of said casing and a source of light, guides located upon diametrically opposite sides of the casing, arms disposed longitudinally of the casing and movable in said guides, a concavo convex lens mounted at the outer ends of the arms and positioned reversely with respect to the first mentioned lens, and means connecting the arms to move the same simultaneously and adjust the relative positions of the lenses.

2. In combination with a flashlight having a tubular casing, a concavo convex lens at one end of said casing and a source of light, longitudinally slotted tubular guides located upon diametrically opposite sides of the casing, arms movable longitudinally within the guides, a second concavo convex lens secured between the outer ends of the arms and positioned reversely with respect to the first mentioned lens, means extending transversely of the casing through the slots of the guides and connected to the arms to move the same and adjust the position of the second lens, and means to hold the arms in adjusted position.

3. In combination with a flashlight having a tubular casing, a concavo convex lens at one end of said casing and a source of light, guides located upon diametrically opposite sides of the casing, arms disposed longitudinally of the casing and movable in said guides, a concavo convex lens mounted at the outer ends of the arms and positioned reversely with respect to the first mentioned lens, a bar extending transversely of the casing and having its opposite ends connected to the arms to move the latter and adjust the position of the second lens, and means carried by the bar and detachably engaging the casing to hold the lens in adjusted position.

In testimony whereof I affix my signature.

NICKOLAS MEROUSSIS.